(12) United States Patent
Qin

(10) Patent No.: US 10,435,114 B2
(45) Date of Patent: Oct. 8, 2019

(54) BICYCLE GEAR SHIFTER

(71) Applicant: S-Ride Bicycle Components (Foshan) Co., Ltd., Foshan (CN)

(72) Inventor: Ruizan Qin, Foshan (CN)

(73) Assignee: S-Ride Bicycle Components (Foshan) Co., Ltd., Guangdong (CN)

( * ) Notice: Subject to any disclaimer, the term of this patent is extended or adjusted under 35 U.S.C. 154(b) by 0 days.

(21) Appl. No.: 16/065,729

(22) PCT Filed: Dec. 6, 2016

(86) PCT No.: PCT/CN2016/108695
§ 371 (c)(1),
(2) Date: Jun. 22, 2018

(87) PCT Pub. No.: WO2017/114105
PCT Pub. Date: Jul. 6, 2017

(65) Prior Publication Data
US 2019/0016413 A1 Jan. 17, 2019

(30) Foreign Application Priority Data

Dec. 29, 2015 (CN) .......................... 2015 1 1023125

(51) Int. Cl.
*B62M 25/04* (2006.01)
*B62K 23/06* (2006.01)
(52) U.S. Cl.
CPC ............. *B62M 25/04* (2013.01); *B62K 23/06* (2013.01)
(58) Field of Classification Search
CPC ....... B62M 25/04; B62M 25/02; B62K 23/06; B62K 23/02
(Continued)

(56) References Cited

U.S. PATENT DOCUMENTS 5,701,786 A * 12/1997 Kawakami ............. B62K 23/06
74/489
6,397,700 B1 6/2002 Liu et al.
(Continued)

FOREIGN PATENT DOCUMENTS

CN 1517265 A 8/2004
CN 1765694 A 5/2006
(Continued)

*Primary Examiner* — David H Bollinger
(74) *Attorney, Agent, or Firm* — Hoffman & Baron, LLP

(57) ABSTRACT

A bicycle gear shifter comprises a shift positioning ratchet provided with positioning teeth, release teeth, and drive teeth, a drive member for rotating the shift positioning ratchet, a mounting member mounted on a bicycle handlebar, a resettable positioning member, a release member for driving movements of the resettable positioning member, a fixing member connected to the mounting member, and an actuating member for driving the shift positioning ratchet to reversely rotate. The shift positioning ratchet and the actuating member are mounted on the fixing member by a rotatable main shaft, the resettable positioning member is sleeved around the rotatable main shaft, and a positioning pawl is provided for engaging with the positioning teeth. The drive member is sleeved around the rotatable main shaft and is provided with a driving part engaging with the driving teeth. The bicycle gear shifter has a simple and compact structure, which reduces the stroke of the corresponding components during the shifting process, raises the responsiveness of a bicycle shifting process, and allows a cyclist to shift gears quickly while riding. The invention also allows a cyclist to select a direction of operation on the basis of actual requirements for flexible use.

12 Claims, 14 Drawing Sheets

(58) Field of Classification Search
USPC .................................. 74/502.2; 254/246, 247
See application file for complete search history.

(56) References Cited

U.S. PATENT DOCUMENTS

| | | |
|---|---|---|
| 2004/0144193 A1 | 7/2004 | Sato et al. |
| 2006/0096404 A1 | 5/2006 | Wessel et al. |
| 2010/0288070 A1 | 11/2010 | Fukao |
| 2012/0297919 A1 | 11/2012 | Fukao et al. |
| 2015/0075321 A1* | 3/2015 | Weiss ............... B62M 25/04 74/575 |
| 2015/0101445 A1* | 4/2015 | Lim ................. B62M 25/04 74/502.2 |
| 2015/0210342 A1* | 7/2015 | Fukao .............. B62K 23/06 74/491 |

FOREIGN PATENT DOCUMENTS

| | | |
|---|---|---|
| CN | 201610212 U | 10/2010 |
| CN | 102582780 A | 7/2012 |
| CN | 102795312 A | 11/2012 |
| CN | 104627315 A | 5/2015 |
| CN | 105438397 A | 3/2016 |
| CN | 205256577 U | 5/2016 |
| FR | 2701917 A1 | 9/1994 |

* cited by examiner

BICYCLE GEAR SHIFTER

CROSS-REFERENCE TO RELATED APPLICATIONS

This application is the U.S. National Phase of International Patent Application No. PCT/CN2016/108695, filed on 6 Dec. 2016, which claims benefit of Chinese Patent Application No. 201511023125.7, filed on 29 Dec. 2015, the contents of which are incorporated herein by reference in their entirety.

FIELD OF THE INVENTION

The present invention relates to the technical field of bicycle components, and more particularly to a bicycle gear shifter.

BACKGROUND OF THE INVENTION

The current bicycle gear shifter is a finger-type gear shifter. In the finger-type gear shifter, the cable shaft is driven to rotate by the lever of the gear shifter toggled by the cyclist's finger, and the shaft is provided in different positions by the fixed positioning member to tighten or release the cable, thereby achieving the purpose of gear shifting by the derailleur which is directly driven by the cable.

However, the existing gear shifter has the following disadvantages:

1. The existing bicycle gear shifter is provided with drive components (positioning teeth and drive positioning components, etc.) and release components (release teeth and release positioning components, etc.) in the internal portion to achieve the upshifting and downshifting functions, which makes the shifter become complex, large, and inconvenient to install on the bicycle handlebar.

2. In the existing bicycle gear shifter, since the driving positioning components and the release positioning components engage with the teeth, their movement trails depend on the distribution of the teeth. Therefore, the gear shifter needs to provide enough space for the movements of driving positioning components and release positioning components internally, and the movement trails of the drive positioning components and the release positioning components are complicated and long, which drastically delays the response of the shifting operation and affects the rider's shifting experience.

3. In the existing bicycle gear shifter, the operation direction of the shifting operation, especially the releasing to the reverse gear is unique in that it involves pulling by the index finger or pushing by the thumb push operation. Thus, the fixed operation direction cannot allow the cyclist to operate according to actual needs for flexible use and greatly limits the utility of the gear shifter. Although double-direction downshifting operation can be achieved by the professional bicycle gear shifters, these gear shifters have complex structure and high cost, which cannot be widely popularized.

The existing bicycle gear shifter fails to achieve the best use effect and work efficiency in practical applications due to the above shortcomings, and cannot be widely applied in the bicycle market.

SUMMARY OF THE INVENTION

In order to solve the above-mentioned problems in the prior art, the present invention is to provide a bicycle gear shifter with a simple and compact structure. The bicycle gear shifter greatly reduces the stroke of the corresponding components during the shifting process, and raises the responsiveness of a bicycle shifting process, and allows a cyclist to shift gears quickly while riding. A further object is to provide a bicycle gear shifter with low cost and high operation performance, thereby allowing a cyclist to downshift conveniently.

In order to achieve the above object, the present invention is implemented by the following technical solutions: A bicycle gear shifter is used to drive and release a cable connected to a bicycle derailleur in order to tighten or release the cable. The bicycle gear shifter comprises a shift positioning ratchet provided with positioning teeth, release teeth, and drive teeth, a drive member for rotating the shift positioning ratchet, a mounting member mounted on a bicycle handlebar, a resettable positioning member, a release member for driving movements of the resettable positioning member, a fixing member connected to the mounting member, and an actuating member for driving the shift positioning ratchet to reversely rotate and for installing the cable;

the shift positioning ratchet and the actuating member are mounted on the fixing member by a rotatable main shaft, the resettable positioning member is sleeved around the rotatable main shaft, and a positioning pawl is provided for engaging with the positioning teeth, the drive member is sleeved around the rotatable main shaft and is provided with a driving part engaging with the driving teeth;

during upshifting, the driving part drives the shift positioning ratchet to rotate, the shift positioning ratchet further drives the resettable positioning member to move and achieve reciprocating linear movements of the resettable positioning member, so that the positioning pawl moving reciprocally and linearly and a first plurality of the positioning teeth of the shift positioning ratchet are engaged and positioned as the shift positioning ratchet rotates; and during downshifting, the release member drives the resettable positioning member to move and restricts a moving stroke of the resettable positioning member by the release teeth, thereby achieving the reciprocating linear movements of the resettable positioning member, the actuating member drives the shift positioning ratchet to rotate reversely, so that the positioning pawl moving reciprocally and linearly and a second plurality of the positioning teeth of the shift positioning ratchet are engaged and positioned as the shift positioning ratchet rotates reversely.

In the above technical solutions, upshifting and downshifting are achieved by the positioning pawl with reciprocating linear movements as well as the positioning teeth and/or the release teeth of the rotating shift positioning ratchet separately without setting up corresponding structures respectively, which can simplify the structure of the gear shifter, make the gear shifter simple and compact, greatly reduce the volume of the gear shifter and facilitate the utilization. At the same time, during the positioning and releasing process, the positioning pawl cooperates with the rotating shift positioning ratchet to achieve upshifting and downshifting with short movement trail implemented by reciprocating linear movement. Compared with the prior art, the present invention not only has a more compact structure, but also accelerates the response of shifter, especially the response of downshifting since the movement trail of the positioning pawl during the positioning and releasing process is linear. Therefore, it allows a cyclist to shift quickly during riding.

Preferably, the resettable positioning member comprises a positioning body and a first resilient member for resetting linear movements of the positioning body; and a mounting groove for fixing the first resilient member is provided at a bottom of the positioning body, wherein a first end of the first resilient member is mounted on the mounting groove, and a second end of the first resilient member contacts with the rotatable main shaft. The first resilient member is a compression spring which can achieve the resetting linear movements of the positioning body.

Preferably, the resettable positioning member further comprises a boss for fixing the positioning pawl mounted on the positioning body and above the mounting groove; the fixing member is further provided with a guide groove that matches with the boss; wherein when the resettable positioning member moves reciprocally and linearly, the boss moves reciprocally and rectilinearly inside the guide groove. The matching arrangement of the guide groove and the boss can improve the stability of the positioning member during the reciprocating linear movements.

The resettable positioning member further comprises an auxiliary claw provided at an end of the positioning body away from the rotatable main shaft, wherein a gap is provided between the auxiliary claw and the positioning pawl.

The positioning body is provided with at least one force receiving portion for the release member to drive, and wherein the resettable positioning member is movable after the release member applies force to the force receiving portion. The force receiving portion of the present invention can be disposed at any position of the positioning body. In this way, reciprocating and linear motion of the resettable positioning member can be achieved by multi-point operations during downshifting, thereby improving the convenience of the operation.

The force receiving portion refers to one of the following:

(1) the force receiving portion is provided on both sides of one end of the positioning body;

(2) the force receiving portion is an end surface of the positioning body;

(3) the force receiving portion is provided on one end of the positioning body; and (4) the force receiving portion is connected to an end surface of the positioning body, and an angle between the force receiving portion and the positioning body is θ, wherein, $0°≤θ<90°$.

In (1) above, the force receiving portion refers to: a first force receiving portion and a second force receiving portion are respectively located on two sides of one end of the positioning body; the release member comprises a release lever and a second resilient member for resetting the release lever; the release lever is located on one side of the positioning body, and a middle portion of one side of the release lever is hinged with the fixing member. In operation, a first end of one side of the release lever pushes the first force receiving portion, or a second end of one side of the release lever pushes the second force receiving portion to drive the resettable positioning member to move; the second resilient member is connected to the release lever. The second resilient member is a torsion spring which can reset the release lever to the initial position.

In (4) above, the release member comprises the release lever and the second resilient member for resetting the release lever, the release lever is located on one side of the positioning body; the middle portion of one side of the release lever is hinged to the fixing member, and the angle between the release lever and the fixing member is θ, wherein, $0°≤θ<90°$. In operation, a first end of one side of the release lever pushes the force receiving portion, or a second end of one side of the release lever pushes the force receiving portion to drive the resettable positioning member to move; the second resilient member is connected to the release lever.

The middle portion of one side of the release member is hinged with the fixing member. When the gear shifter is released to the reverse gear, the resettable positioning member is driven to move by pulling it with a forefinger, pushing it with a thumb, or toggling it to different operation directions by the cyclist, so that downshifting can be realized. This selective operation direction allows the cyclist to operate flexibly according to actual needs, achieves high-performance operation of the gear shifter, and improves the convenience of downshifting operation.

The fixing member comprises a bottom plate and a top plate connected to the bottom plate, the shift positioning ratchet and the actuating member are mounted between the bottom plate and the top plate through the rotatable main shaft, and the mounting member is connected to the bottom plate;

The actuating member rotates coaxially with the shift positioning ratchet; the actuating member comprises a hollow shaft for arranging the cable and a third resilient member for resetting rotation of the hollow shaft; the third resilient member and the hollow shaft are sleeved around the rotatable main shaft; a first end of the third resilient member is mounted on the hollow shaft, and a second end of the third resilient member contacts with the top plate to achieve the resetting rotation of the hollow shaft and to drive the shift positioning ratchet that rotates coaxially with the hollow shaft to rotate reversely. After the arrangement of the shift positioning ratchet and the actuating member, the shift positioning ratchet is in contact with the bottom plate, and the actuating member is in contact with the top plate. The third resilient member is a torsion spring which can drive the shift positioning ratchet to move reversely.

The drive member comprises a drive lever connected to the driving part, a fourth resilient member for resetting the drive lever, and a fifth resilient member for resetting the driving part; the fifth resilient member is provided between the driving part and the drive lever, wherein a first end of the fifth resilient member contacts with the driving part, and a second end of the fifth resilient member contacts with the drive lever; the fourth resilient member is sleeved around the rotatable main shaft, wherein a first end of the fourth resilient member contacts with the drive lever, and a second end of the fourth resilient member contacts with the fixing member. The fourth and fifth resilient members are a torsion spring which can drive the drive lever and drive part to return to the initial position.

The shift positioning ratchet comprises a ratchet body, and the drive teeth provided along an edge of the ratchet body, the ratchet body is provided with a positioning groove, and the positioning teeth and the release teeth are provided along two interior sides of the positioning groove respectively, wherein the positioning teeth and the release teeth arranged alternately. Alternatively, the shift positioning ratchet comprises a ratchet body, the drive teeth are provided along a first edge of the ratchet body, the ratchet body is provided with a positioning groove, the positioning teeth are provided along an edge on one side of the positioning groove, the release teeth are provided along a second edge of the ratchet body close to the positioning groove, and the positioning teeth, wherein the release teeth are arranged alternately.

In the case of the positioning teeth and the release teeth provided along the edge of two interior sides of the positioning groove, the positioning teeth and the release teeth of the shift positioning ratchet are provided in the same side of the ratchet and in the same positioning groove. Then, by manipulating the drive lever and the release lever, a simple and short-distance reciprocating linear movement is formed inside the positioning groove during the positioning and releasing process of the positioning pawl, which achieves the upshifting and downshifting function of the shifter.

Compared with the prior art, the present invention has the following advantages:

1. The bicycle gear shifter has a simple compact structure, which greatly reduces the stroke of the corresponding components during the shifting process, raises the responsiveness of a bicycle shifting process, and allows a cyclist to shift gears quickly while riding; and 2. The bicycle gear shifter has the advantages of low cost and high performance operation, and allows a cyclist to select a direction of operation on the basis of actual requirements for flexible use, thereby offering the convenience for a cyclist to release to the reverse gear function.

DESCRIPTION OF EXAMPLE EMBODIMENTS OF THE INVENTION

Figure 1:
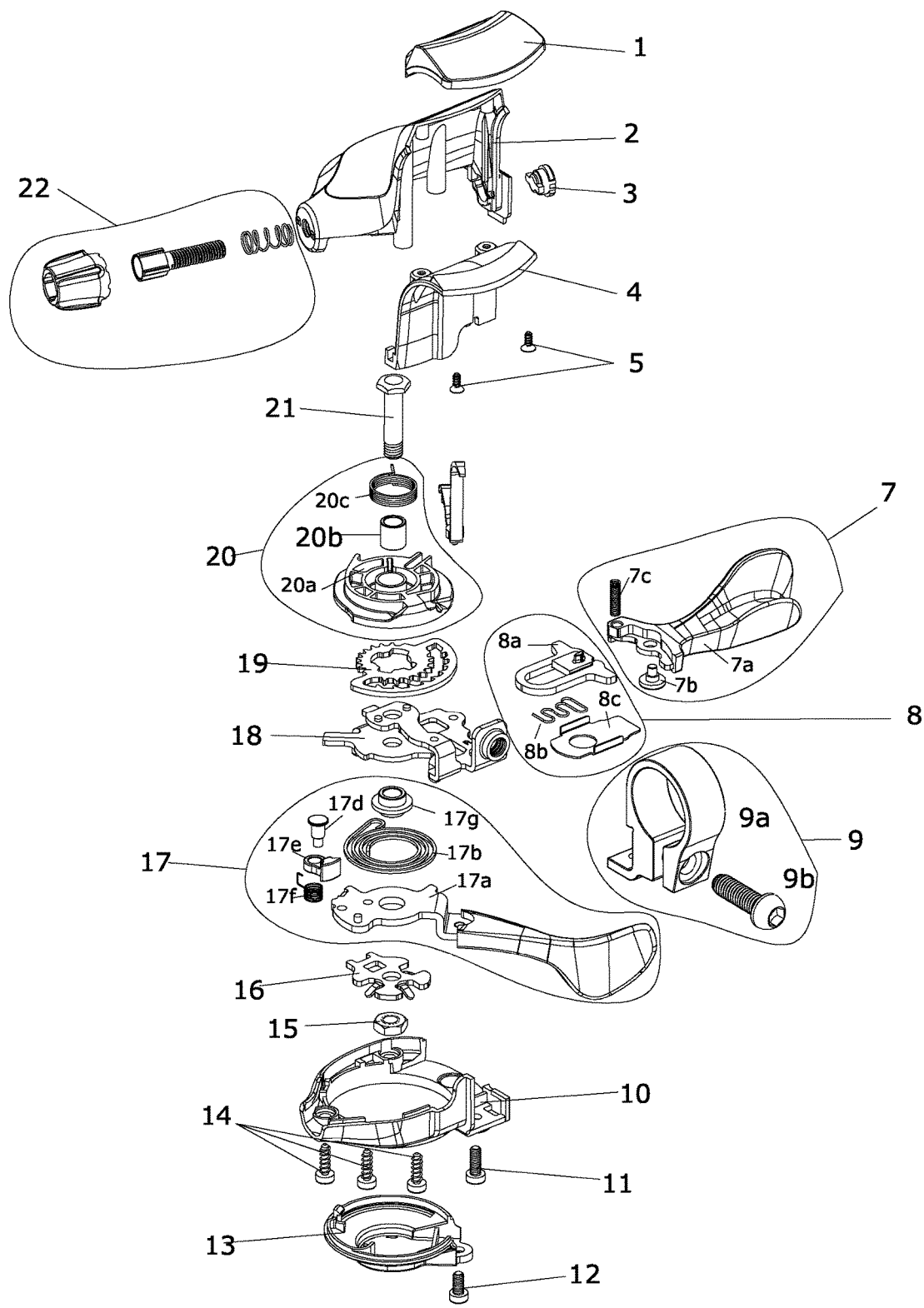
FIG. 1 is an exploded drawing of the bicycle gear shifter in the present invention.
Figure 2:
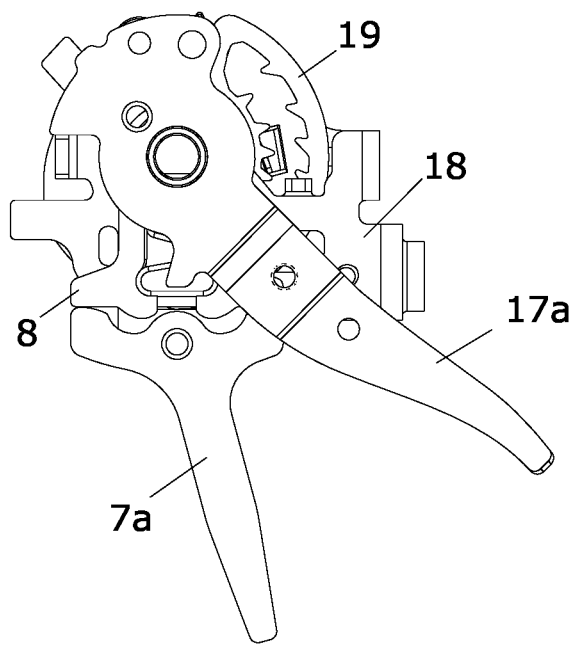
FIG. 2 is an assembly drawing of core components of the gear shifter.
Figure 3:
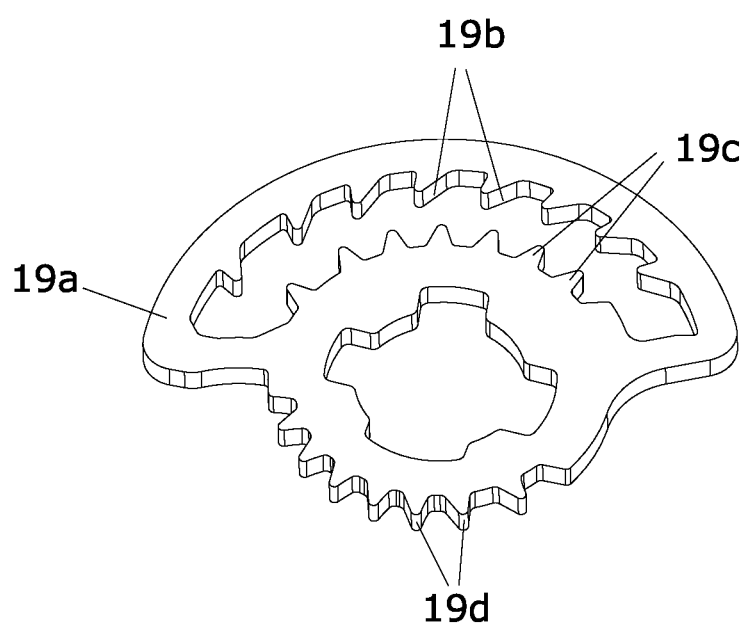
FIG. 3 is a schematic drawing of the shift positioning ratchet.
Figure 4:
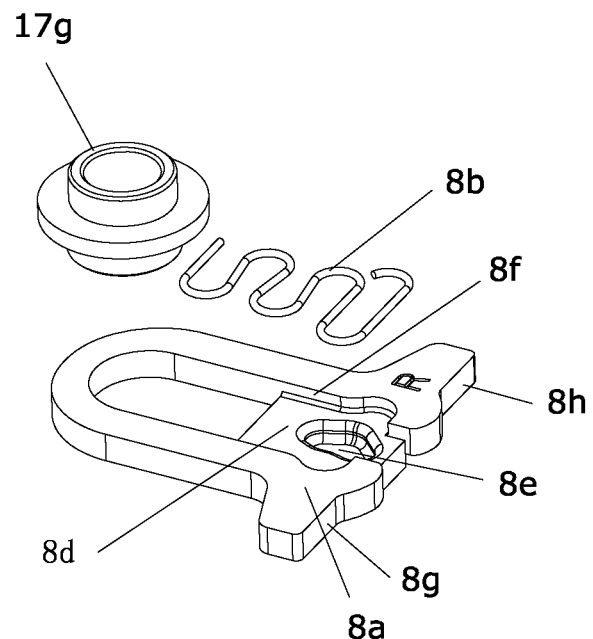
FIG. 4 is an assembly drawing of the positioning member.
Figure 5:
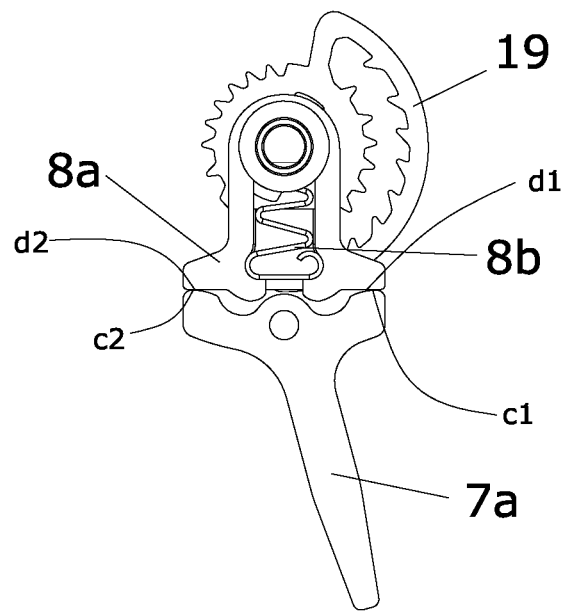
FIG. 5 is an assembly drawing of the positioning member and the release member.
Figure 6:
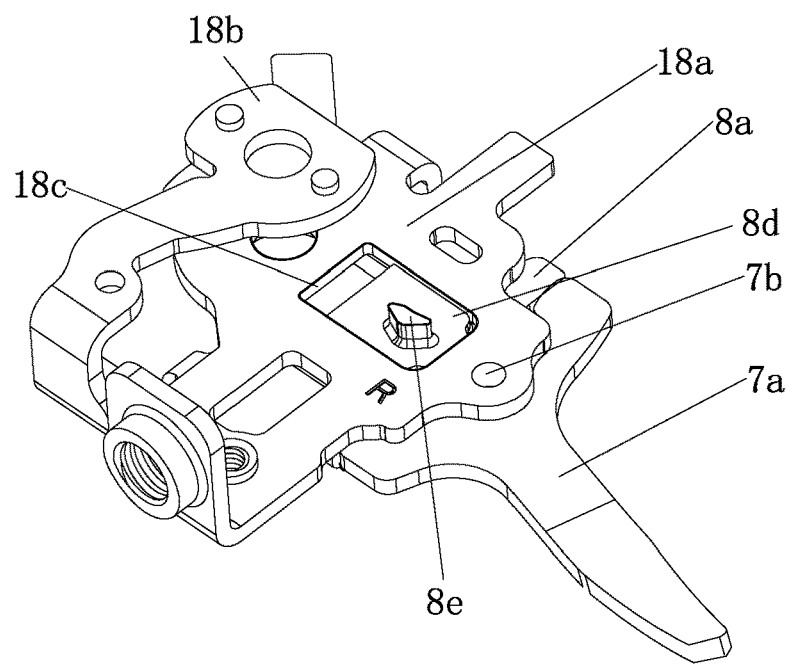
FIG. 6 is an assembly drawing of the positioning member and the fixing member.

The present invention will be further described in detail below with reference to examples and Figures.

Embodiment 1

As shown in FIG. 1 to FIG. 10H, the bicycle gear shifter of the present invention is used to drive (pull) and release the rope 23 connected to a bicycle derailleur to tighten or release the rope, so that the rope 23 directly drives the derailleur of the bicycle to achieve the bicycle gear shifting. The gear shifter of the present invention comprises upper housings (1, 2 and 4) connected by fasteners (3 and 5), lower housings (10 and 13) connected by fasteners (14 and 12), rope guiding members 22 connected to upper housing, and main components are provided in the upper and lower housings. The main components comprise a shift positioning ratchet 19 provided with a number of positioning teeth, release teeth 19c and drive teeth 19d, a drive member 17 for driving the rotation of the shift positioning ratchet 19, a mounting member 9 mounted on a bicycle handlebar, a resettable positioning member 8, a release member 7 for driving movements of the positioning member 8, a fixing member 18 connected to the mounting member 9, and an actuating member 20 for driving the reverse rotation of the shift positioning ratchet 19.

Wherein, the shift positioning ratchet 19 and the actuating member 20 are mounted on the fixing member 18 by a rotatable main shaft 21, the positioning member 8 is sleeved around the rotatable main shaft 21, and the positioning pawl 8e engaging with the positioning teeth 19b is provided. The drive member 17 is sleeved around the rotatable main shaft 21 through a rotating bushing 17g of the rotatable main shaft 21, and is provided with a drive part 17e engaging with the drive teeth 19d Finally, a pressing plate 16 is sleeved around the rotatable main shaft 21 and connected to the rotatable main shaft 21 through the nut 15, so that the shift positioning ratchet 19, the actuating member 20, the positioning member 8, and the drive member 17 are mounted on the fixing member 18.

When the gear shifter is upshifted, the drive part 17e drives the shift positioning ratchet 19 to rotate counterclockwise, to drive the resettable positioning member 8 to move and achieve the reciprocating linear movements of the positioning member 8, so that the positioning pawl 8e in reciprocal linear movements and a number of positioning teeth 19b of the shift positioning ratchet 19 rotated counterclockwise are engaged and positioned. When the shifter downshifts, the release member 7 drives the resettable positioning member 8 to move and restricts the moving stroke of the positioning member 8 by the release teeth 19c, to achieve the reciprocating linear movements of the positioning member 8. Meanwhile, the actuating member 20 drives the shift positioning ratchet 19 to rotate clockwise, so that the positioning pawl 8e moves reciprocally and linearly and a number of positioning teeth 19b of the shift positioning ratchet 19 rotating clockwise are engaged and positioned. During the process of downshifting, the positioning pawl 8e alternately engages with the positioning teeth 19b and the release teeth 19c.

The positioning member 8 of the gear shifter comprises a positioning body 8a, a first resilient member 8b for positioning the resetting linear movements of the positioning body 8a, and a prevention cover 8c for preventing the first resilient member 8b from falling out. Wherein, a mounting groove 8f for fixing the first resilient member 8b is provided on the bottom of the positioning body 8a, one end of the first resilient member 8b is mounted on the mounting groove 8f, and the other end of the resilient member 8b connects with the rotating bushing 17g of the rotatable main shaft 21. The prevention cover 8c is provided with a through hole for the rotatable main shaft 21 and the bottom of the positioning body 8a is closed with the prevention cover 8c. The positioning member 8 further comprises a boss 8d for fixing the positioning pawl 8e which is mounted on the positioning body 8a and above the mounting groove 8f. The positioning body 8a is provided with at least one force receiving portion for the release member 7 to drive, and the force receiving portion comprises a first force receiving portion 8g and a second force receiving portion 8h which are respectively located on two sides of one end of the positioning body 8a. The first resilient member 8b is a compression spring.

The release member 7 is provided on the side of the positioning member 8, and the release member 7 drives the resettable positioning member 8 by pushing the first force receiving portion 8g or the second force receiving portion 8h. The release member 7 comprises a release lever 7a and a second resilient member 7c for resetting the release lever 7a. The release lever 7a is located on one side of the positioning body 8a, and the middle portion of one side of the release lever 7a is hinged with fixing member 18 through the rotation shaft 7b. In operation, the first end of one side of the release lever 7a pushes the first force receiving portion 8g or the second end of one side of the release lever 7a pushes the second force receiving portion 8h to drive the resettable positioning member 8 to move. The second resilient member 7c is connected to the release lever 7a, and the second resilient member 7c is a torsion spring. With this design, when the shifter is downshifted, the resetting positioning member 8 is driven to move by pulling it with forefinger or pushing it with thumb by the cyclist, so that the downshifting function of the shifter can be realized. This selective operation direction allows the cyclist to operate flexibly according to actual needs, achieves high-performance operation of the gear shifter, and improves the convenience of downshifting operation.

The fixing member 18 of the gear shifter comprises a bottom plate 18a and a top plate 18b connected to the bottom plate 18a. The shift positioning ratchet 19 and the actuating member 20 are mounted between the bottom plate 18a and the top plate 18b through the rotatable main shaft 21. The seat 9a of the mounting member 9 is installed by connecting the screw 9b to the bottom plate 18a, so that the gear shifter can be installed on the handlebar of the bicycle through the mounting member 9. The bottom plate 18a of the fixing member 18 is also provided with a guide groove 18c that matches with the boss 18d. When the positioning member 8 moves reciprocally and linearly, the boss 18d moves reciprocally and linearly inside the guide groove 18c, to improve the stability during the reciprocating linear movements of the positioning member 8.

The actuating member 20 rotates coaxially with the shift positioning ratchet 19, wherein the actuating member 20 comprises a hollow shaft 20a sleeved around the rotatable main shaft 21 through a rotating sleeve 20b and a third resilient member 20c for resetting rotation of the hollow shaft 20a. One end of the rope 23 is mounted on the hollow shaft 20a, and the other end is connected to the bicycle derailleur through the rope guiding member 22. The third resilient member 20c is sleeved around the rotatable main shaft 21, one end of which is mounted on the hollow shaft 20a, and the other end contacts with the top plate 18b to achieve the resetting rotation of the hollow shaft 20a and to drive the shift positioning ratchet 19 that rotates coaxially with the hollow shaft 20a to rotate clockwise. The third resilient member 20c may be a torsion spring.

The drive member 17 comprises a drive lever 17a connected to the drive part 17e, a fourth resilient member 17b for resetting the drive lever 17a, and a fifth resilient member 17f for resetting the drive part 17e. Wherein, the drive part 17e contacts with the drive lever 17a through fixing member 17d, the fifth resilient member 17f is provided between the drive part 17e and the drive lever 17a. One end of the fifth resilient member 17f contacts with the drive part 17e, and the other end contacts with the drive lever 17a. The fourth resilient member 17b is sleeved around the rotatable main shaft 21, one end of which contacts with the drive lever 17a, and the other end contacts with the fixing member 18.

The shift positioning ratchet 19 comprises a ratchet body 19a, and a number of drive teeth 19d provided along the edge of the ratchet body 19a. The ratchet body 19a is provided with a positioning groove, wherein a number of positioning teeth 19b and release teeth 19c are provided along two interior sides of the positioning groove respectively and are arranged alternately. This structure enables the positioning teeth 19b of the shift positioning ratchet 19 and the release teeth 19c to be provided in the same side of the ratchet and in the same positioning groove. Then, by manipulating drive lever 17a and the release lever 7a, a simple and short-distance reciprocating linear movement is formed inside the positioning groove, during the positioning and releasing process of the positioning pawl 8e, to achieve the forward gear and reverse gear function of the gear shifter.

Figure 9A:
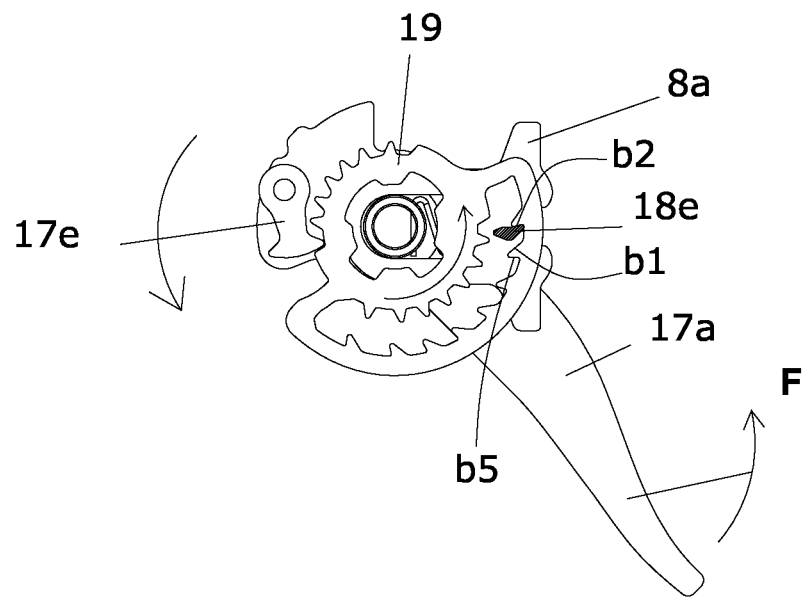
FIGS. 9A-9H are schematic drawings of the process when the gear shifter upshifts respectively.
Figure 9B:
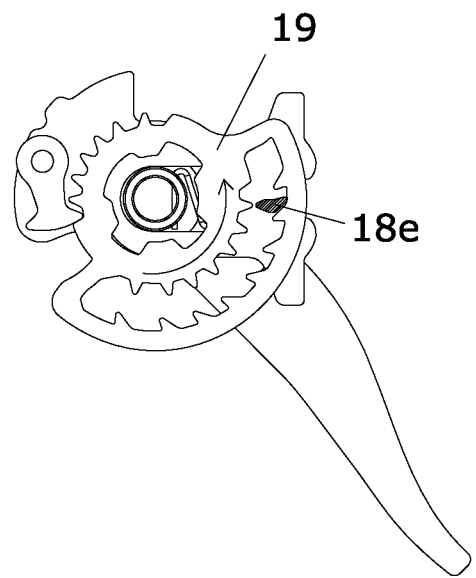
Figure 9C:
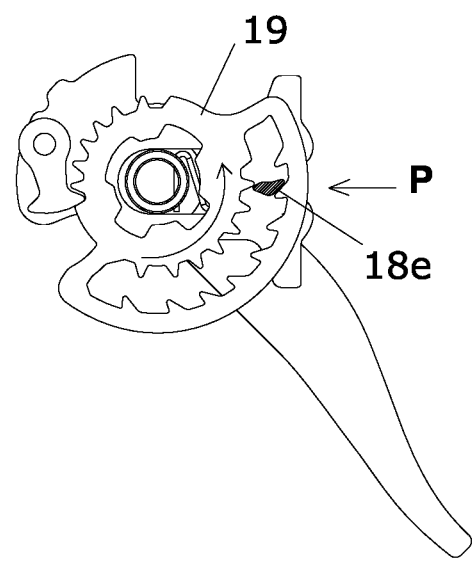
Figure 9D:
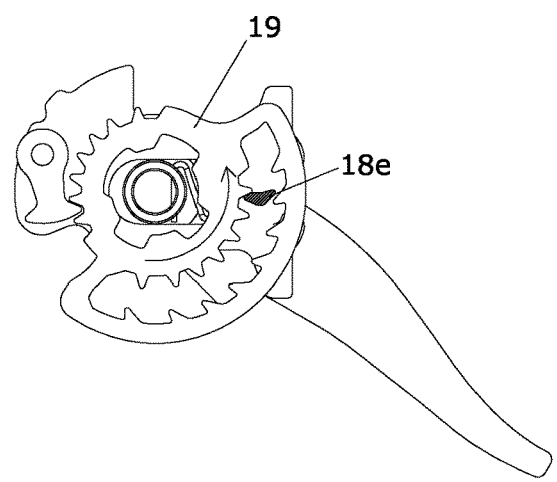
Figure 9E:
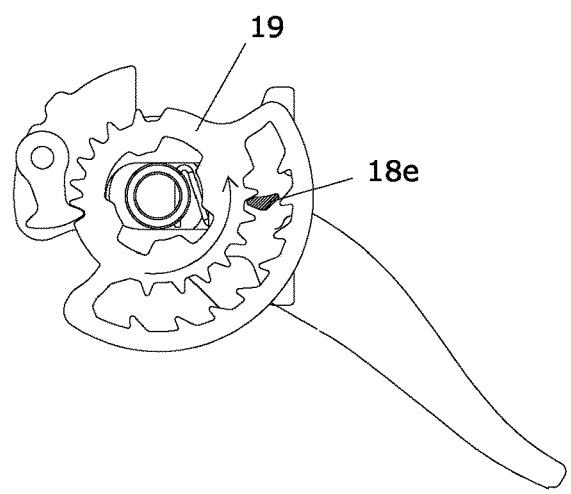
Figure 9F:
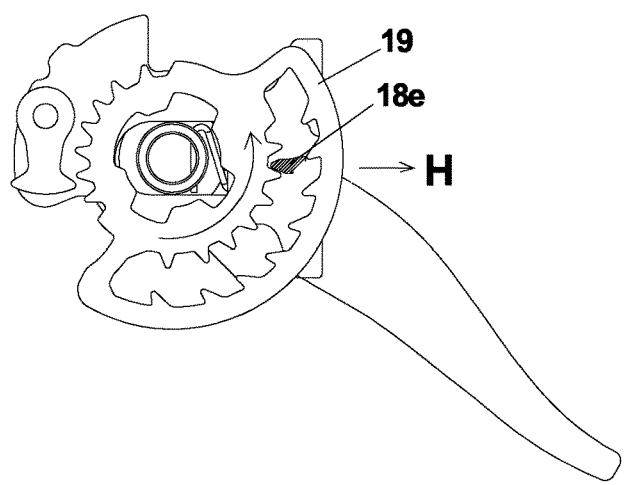
Figure 9G:
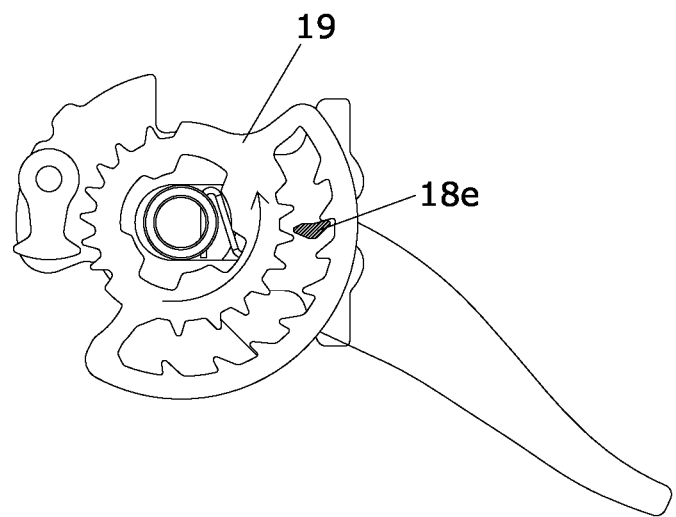
Figure 9H:
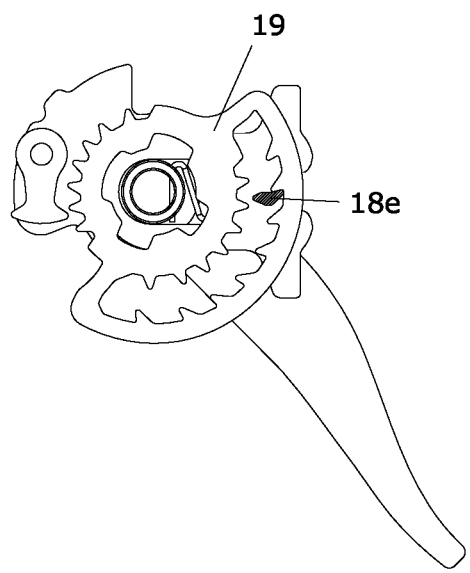

The gear shifter in the present invention has a simple and compact structure; the working mechanism of the present invention is as followings:

The schematic diagram of the forward gear process of the gear shifter in the present invention is as shown in FIGS. 9A-9H. FIG. 9A is the original state of the shift positioning ratchet 19 when it is positioned in one of the positioning teeth 19b. When the cyclist exerts a counterclockwise force F on the drive lever 17a, the drive part 17e engages with the drive teeth 19d to drive the shift positioning ratchet 19 to rotate counterclockwise, the a1 surface of the positioning pawl 8e (FIG. 7) moves away from the b2 surface of the shift positioning ratchet 19 (FIG. 9A). At this time, the shift positioning ratchet 19 continues to rotate in the clockwise direction. When a2 surface of the positioning pawl 8e is in contact with the b1 surface of the shift positioning ratchet (FIG. 9B), the force generated by the bevel surface b1 causes the positioning pawl 8e to move in the direction of the P as shown in FIG. 9C (which is simultaneously guided by the guide groove 18c of the bottom plate 18a). Until the contact surface reaches the addendum of the shift positioning ratchet 19, due to the action of the first resilient member 8b, the positioning pawl 8e shifts the moving direction to H as shown in FIG. 9F to realize the resetting linear movement when the positioning ratchet 19 continues to rotate, as shown in FIG. 9D and FIG. 9E. Until the a1 surface of the positioning pawl 8e is in contact with the b5 surface of the shift positioning ratchet 19 and the positioning pawl 8e engages with the positioning teeth 9b (FIGS. 9G and 9H), positioning pawl 8e switches the position from one positioning teeth 9b to the next positioning tooth 9b, to achieve upshifting. If the rider continuously exerts a force on the drive lever 17a, the entire movement process is repeated as previously described.

Figure 10A:
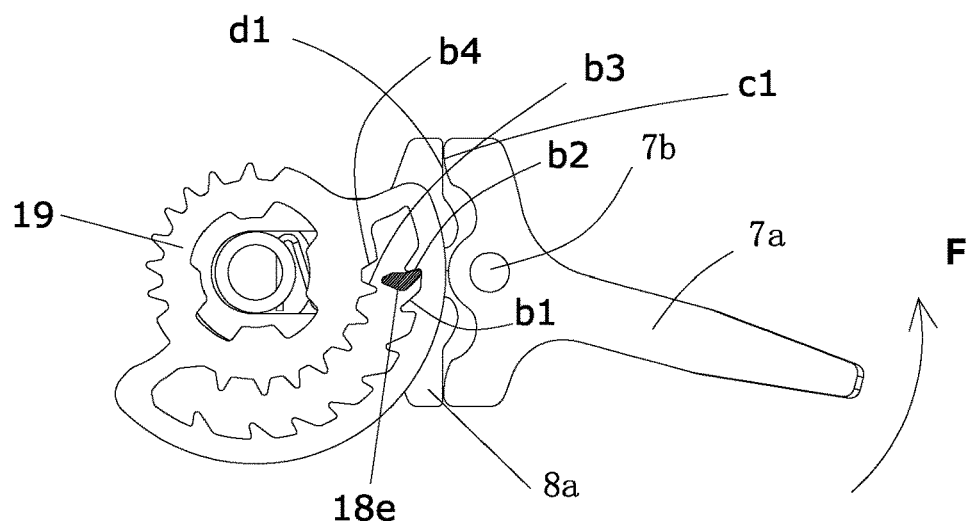
FIGS. 10A-10H are schematic drawings of the process when the gear shifter downshifts respectively.
Figure 10B:
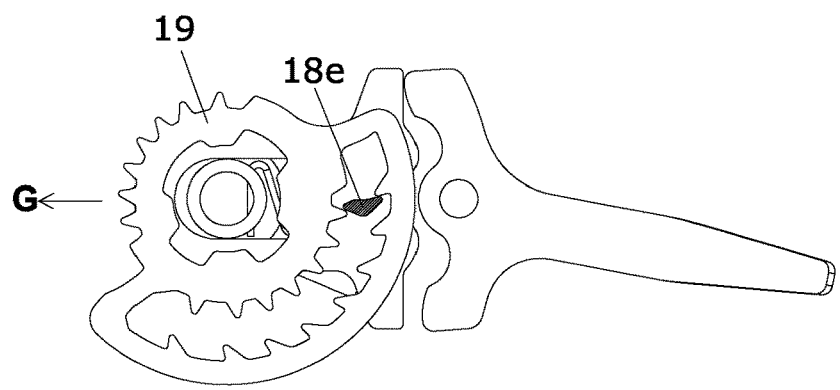
Figure 10C:
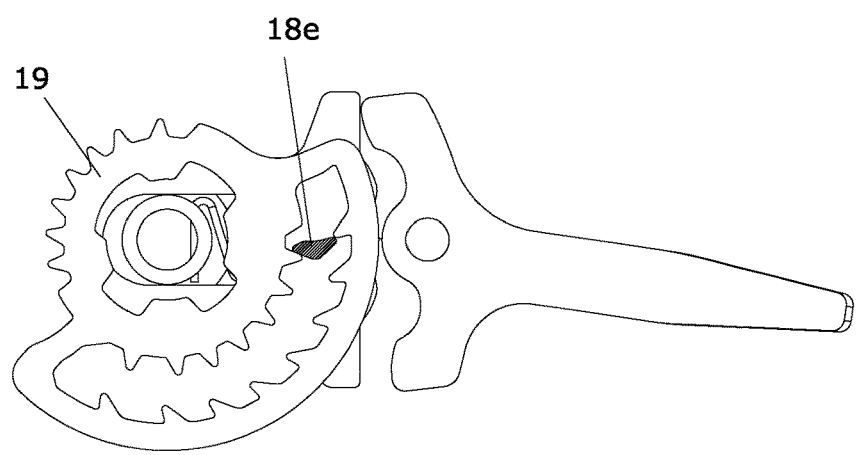
Figure 10D:
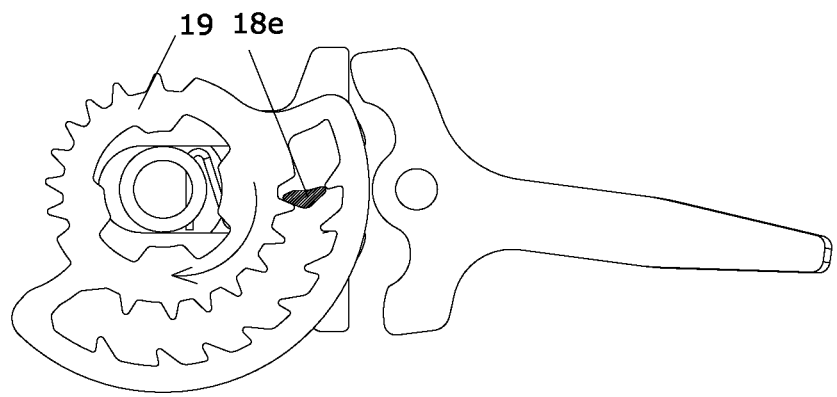
Figure 10E:
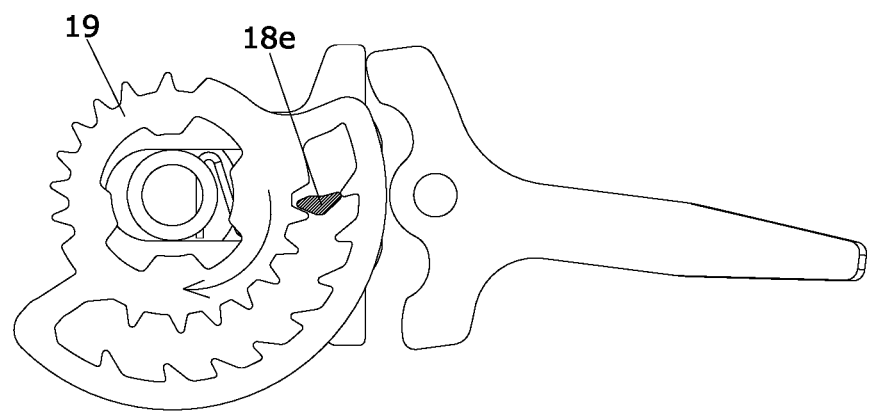

The schematic diagram of the downshifting process of the gear shifter in the present invention is as shown in FIGS. 10A-10H. FIG. 10A is the original state of the shift positioning ratchet 19 when it is positioned in one of the positioning teeth 19b. When the cyclist exerts a counterclockwise force F on the drive lever 17a, the drive lever 17a rotates around rotating shaft 7b, the c1 surface of the drive lever 17a (FIG. 5) applies force on the d1 surface of the positioning pawl 8e. At this time, the positioning pawl 8e linearly moves through the boss 8d along the guide groove 18c of the bottom plate 18a toward the direction G in FIG. 10B. The a1 surface of the positioning pawl 8e moves away from the b2 surface of the shift positioning ratchet 19 (FIG. 10B), the drive lever 17a continues to rotate and the positioning pawl 8e continues to move linearly. When the contact surface between the positioning pawl 8e and the positioning teeth 19b of the shift positioning ratchet 19 reaches the addendum, the shift positioning ratchet 19 rotates clockwise under the rebound effect of the third resilient member 20c of the actuating member 20 (FIG. 10D). During rotation of the shift positioning ratchet 19, the b4 surface of the release teeth 19c of the shifting ratchet 19 comes into contact with the a4 surface of the positioning pawl 8e (that is, the release teeth 19c restricts the moving stroke of the positioning pawl 8e). At this time, the positioning pawl 8e moves to the end, and applying forces to the release lever 7a cannot cause the shift positioning ratchet 19 to rotate anymore.

Figure 10F:
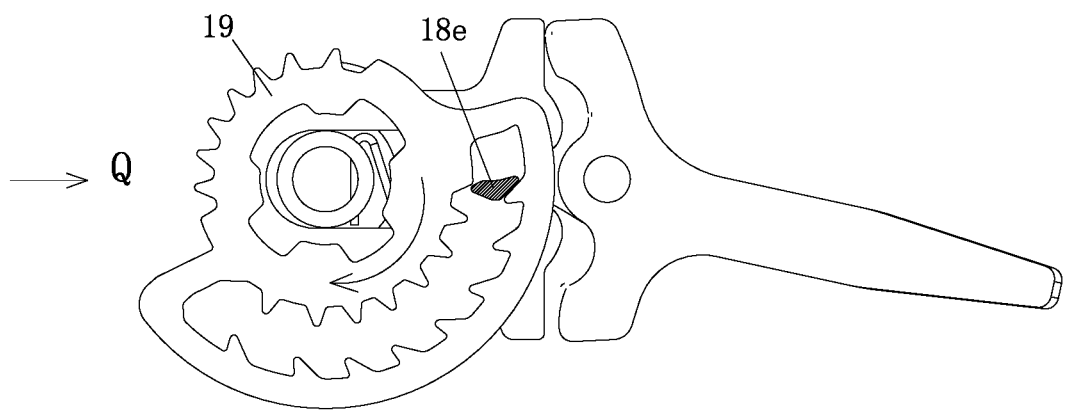
Figure 10G:
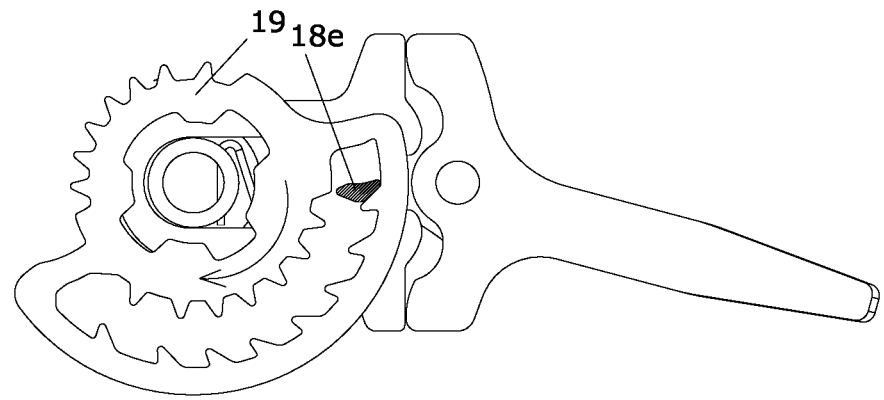
Figure 10H:
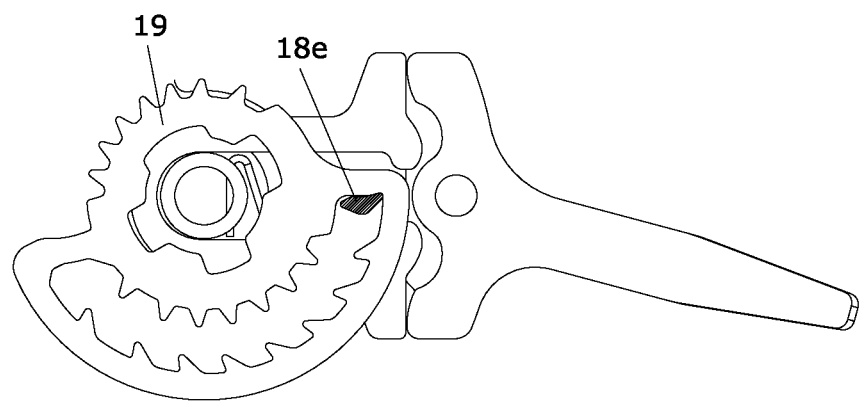

At this time, the force applied to the release lever 7a is stopped, and the shift positioning ratchet 19 linearly moves in the reverse direction under the rebound effect of the first resilient member 8b, the direction of Q as shown in FIG. 10F. Meanwhile, the release lever 7a is returned to the initial position (FIG. 10G) under the double action of the second resilient member 7c and the positioning pawl 8e, and the shift positioning ratchet 19 is rotated to the position shown in FIG. 10H under the rebound effect of the third resilient member 20c of the actuating member 20, so that the positioning pawl 8e reaches the position of the previous positioning tooth 9b. In this way, the positioning pawl 8e switches position from one positioning tooth 9b to the last positioning tooth 9b, to achieve downshifting. If the rider continuously exerts a force on the release lever 7a, the entire movement process is repeated as previously described.

Figure 7:
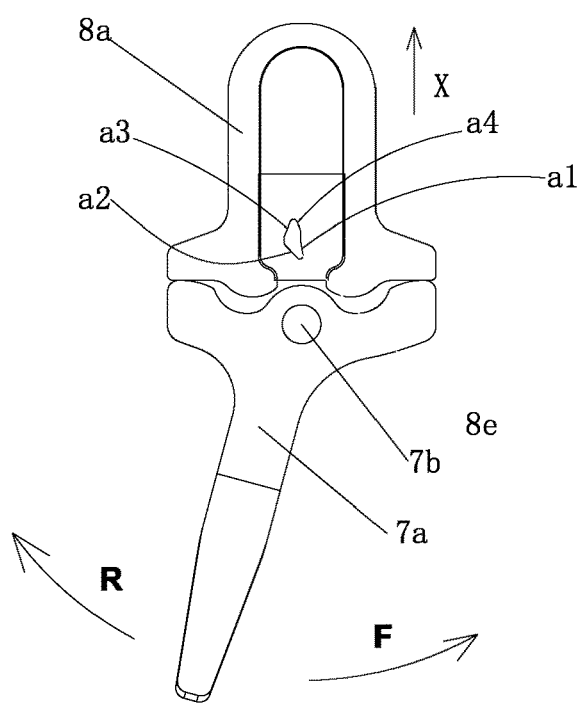
FIG. 7 shows movements between the positioning member and the release lever.
Figure 8:
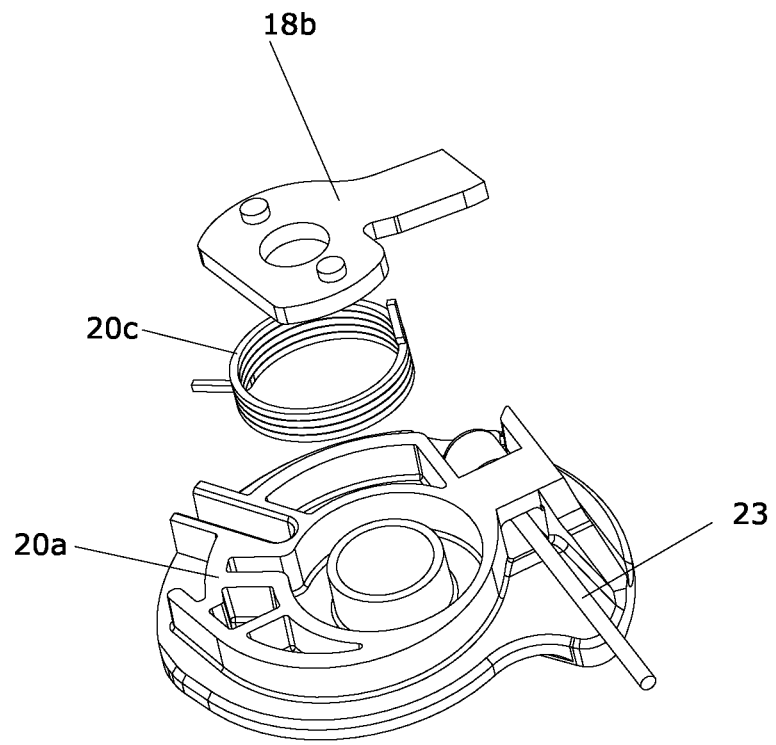
FIG. 8 is a schematic drawing of the structure of the actuating member.

As shown in FIG. 7, the force exerted on the release lever 7a can also coexist in the R direction and the F direction, so that the release action can be realized in both directions. The movement process is the same as that in the force F direction.

Embodiment 2

Figure 11A:
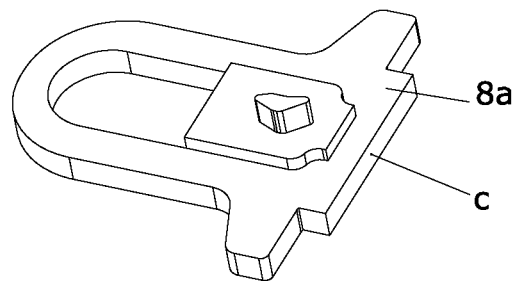
FIGS. 11A-11C show several methods of the force receiving portion in embodiment 2.
Figure 11B:
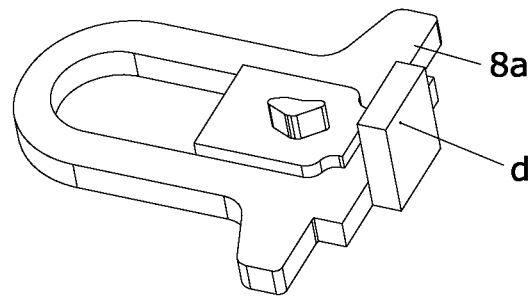
Figure 11C:
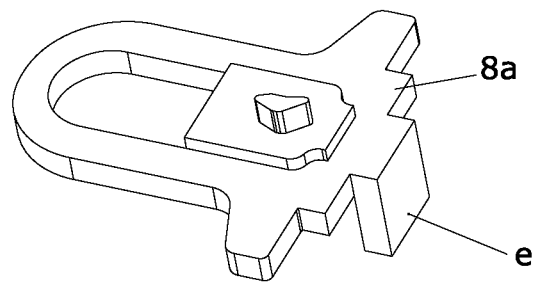

The differences between the second embodiment and the first embodiment are the release structure and the implementation method of the force receiving portion. As shown in FIGS. 11A-11C, the force receiving portion of this embodiment may be one of the following ways:

(1) The force receiving portion c is an end surface of the positioning body 8a;

(2) The force receiving portion d or the force receiving portion e is connected to one end surface of the positioning body 8a.

The force receiving portion may also be on one end of the positioning portion. The resettable positioning member can linearly move after the release member applies force to the above-mentioned different force receiving portions. In this way, linear motion of the positioning member can be achieved by multi-point operations during the process of downshifting, thereby improving the convenience of the operation. The structural design of the release member should be matched with the corresponding force receiving structure to achieve the force application.

The other structures of the present embodiment are the same as those of the first embodiment.

Embodiment 3

Figure 12:
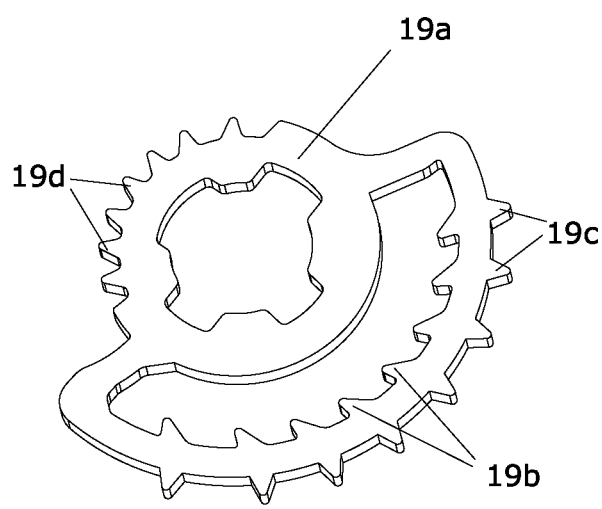
FIG. 12 is a schematic drawing of the structure of the shift positioning ratchet in embodiment 3.
Figure 13:
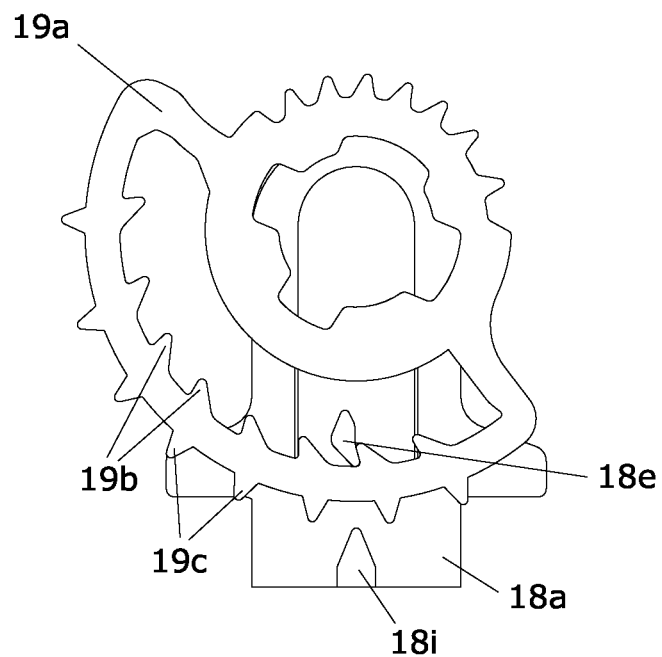
FIG. 13 is an assembly drawing of the shift positioning ratchet and the positioning member in Embodiment 3.

The differences between the present embodiment and the first embodiment are the structure of the shift positioning ratchet and the structure of the positioning member. As shown in FIGS. 12 and 13, the shift positioning ratchet comprises a ratchet body 19a, and a number of drive teeth 19d are provided along the edge of the ratchet body 19a. The ratchet body 19a of the shift positioning ratchet is provided with a positioning groove, a number of positioning teeth 19b are provided along the edge on one side of the positioning groove, and a number of release teeth 19c are provided along the edge of the ratchet body 19a close to the positioning groove. The positioning teeth 19b and the release teeth 19c are arranged alternately.

The structure of the positioning member of this embodiment is provided with an auxiliary claw 8i on the basis of the structure of the positioning member in the first embodiment. The auxiliary claw 8i is provided at the end of the positioning body 8a away from the rotatable main shaft, and there is a gap between the auxiliary claw 8i and the positioning pawl 8e. When the positioning member 8 is sleeved around the rotatable main shaft, the positioning pawl 8e and the auxiliary claw 8i are positioned on the positioning teeth 19b side and the release teeth 19c side, respectively. The force receiving portion of the positioning member is an end surface of the positioning body 8a.

When the gear shifter upshifts, the drive member drives the shift positioning ratchet to rotate counterclockwise to drive the resettable positioning pawl 8e to move, so that the positioning pawl 8e moves reciprocally and linearly within the positioning groove to achieve positioning for reciprocal linear movement. The positioning pawl 8e that moves reciprocally and linearly engages with a number of positioning teeth 19b of the shift positioning ratchet that rotates counterclockwise, thereby achieving upshifting function of the gear shifter.

When the gear shifter is downshifted, the release member drives the resettable positioning body 8a to move so that both the positioning pawl 8e and the auxiliary claw 8i move reciprocally and linearly. When the positioning pawl 8e moves away from the positioning teeth 19b, the actuation member drives the shift positioning ratchet to rotate clockwise under the rebound effects of the third resilient member. When the auxiliary claw 8i is in contact with the release teeth 19c, the moving stroke of the positioning pawl 8e can be limited so that the positioning pawl 8e, which is reset by the first resilient member, can engage and be positioned with the last positioning teeth 19b of the shift positioning ratchet, thereby achieving downshifting function of the gear shifter.

The other structures of the present embodiment are the same as those of the first embodiment.

Embodiment 4

The differences between the present embodiment and the first embodiment are the arrangement of the force receiving portion and the structure of the release member.

Figure 14:
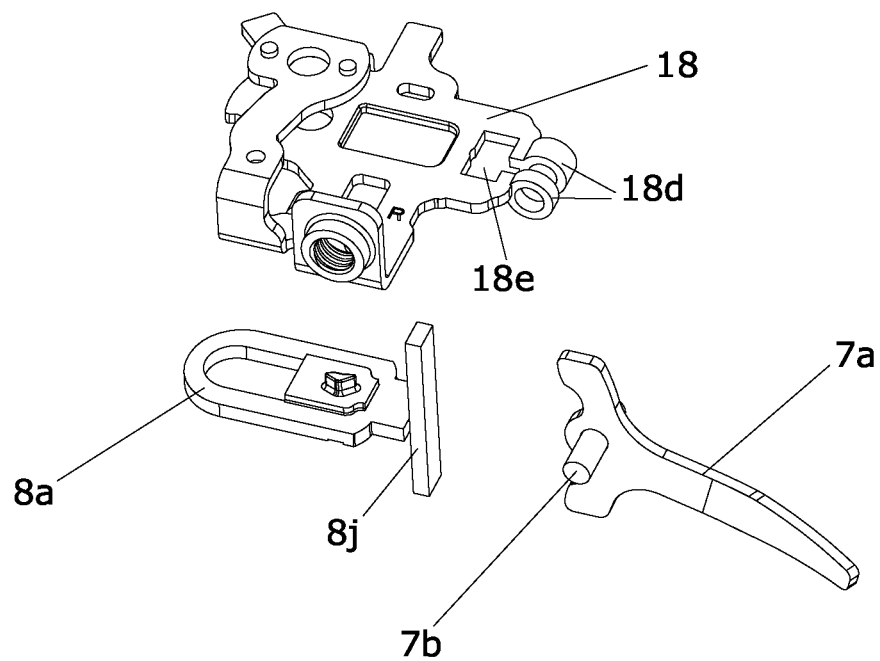
FIG. 14 is an exploded drawing of the fixing member, the release member and the positioning member in Embodiment 4.
Figure 15:
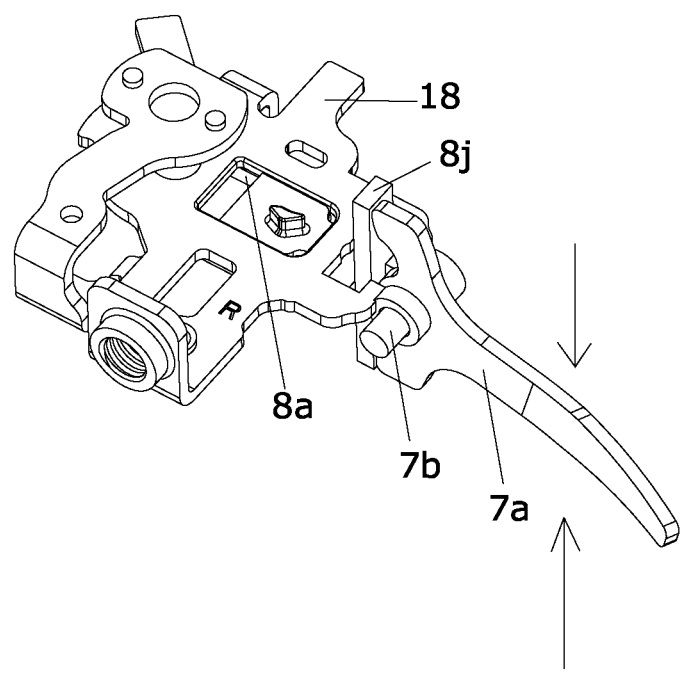
FIG. 15 is a connection drawing of the fixing member, the release member and the positioning member in the fourth embodiment.

As shown in FIGS. 14 and 15, the force receiving portion 8j is connected to an end surface of the positioning body 8a, and the angle between the force receiving portion 8j and the positioning body 8a is 90°. The fixing member 18 is provided with a hinge point 18d and a through hole 18e for the force receiving portion 8j to pass through. The release member comprises a release lever 7a and a second resilient member 2 for resetting the release lever 7a (not shown, the same as 7c in the first embodiment), the release lever 7a is provided on one side of the positioning body 8a. The middle portion of one side of the release lever 7a is hinged to the hinge point 18d of the fixing member 18 through the rotation shaft 7b, and the angle between the release lever 7a and the fixing member 18 is 90°. In operation, the first end of one side of the release lever 7a pushes the force receiving portion 8j, or the second end of one side of the release lever 7a pushes the force receiving portion 8j to drive the resettable positioning member to move, and the second resilient member (not shown, same as 7c in the first embodiment) is connected to the release lever 7a. The cyclist can release the gear shifter to downshift by toggling the release lever 7a up and down, thereby improving the convenience of utilization.

The other structures of the present embodiment are the same as those of the first embodiment.

Embodiment 5

The differences between the present embodiment and the fourth embodiment is only that: the force receiving portion is connected to an end surface of the positioning body, the angle between the force receiving portion and the positioning body is θ, wherein, 0°≤θ<90°. The central portion of the released lever is hinged with the fixing member and the angle between the release lever and the fixing member is α.

The other structures of the present embodiment are the same as those of the fourth embodiment.

Embodiment 6

The only difference between the present embodiment and the first embodiment is that: the force receiving portion can be provided at any position of the positioning portion body. Since the first resilient member drives the positioning member to move reciprocally and linearly by stretching and resetting, the release member exerts force on the force receiving portion by pushing or pulling to drive the resettable positioning member to move.

What is claimed is:

1. A bicycle gear shifter to drive and release a cable connected to a bicycle derailleur in order to tighten or release the cable, wherein the bicycle gear shifter comprises:
    a shift positioning ratchet provided with positioning teeth, release teeth, and drive teeth, a drive member for rotating the shift positioning ratchet, a mounting member mounted on a bicycle handlebar, a resettable positioning member, a release member for driving movements of the resettable positioning member, a fixing member connected to the mounting member, and an actuating member for driving the shift positioning ratchet to reversely rotate and for installing the cable;
    the shift positioning ratchet and the actuating member are mounted on the fixing member by a rotatable main shaft, the resettable positioning member is sleeved around the rotatable main shaft, and a positioning pawl is provided for engaging with the positioning teeth, the drive member is sleeved around the rotatable main shaft and is provided with a driving part engaging with the driving teeth;
    when upshifting, the driving part drives the shift positioning ratchet to rotate, the shift positioning ratchet further drives the resettable positioning member to move and achieve reciprocating linear movements of the resettable positioning member, so that the positioning pawl moving reciprocally and linearly and a first plurality of the positioning teeth of the shift positioning ratchet are engaged and positioned as the shift positioning ratchet rotates; and
    when downshifting, the release member drives the resettable positioning member to move and restricts a moving stroke of the resettable positioning member by the release teeth, thereby achieving the reciprocating linear movements of the resettable positioning member, the actuating member drives the shift positioning ratchet to rotate reversely, so that the positioning pawl moving reciprocally and linearly and a second plurality of the positioning teeth of the shift positioning ratchet are engaged and positioned as the shift positioning ratchet rotates reversely.

2. The bicycle gear shifter according to claim 1, wherein the resettable positioning member comprises a positioning body and a first resilient member for resetting linear movements of the positioning body; and a mounting groove for fixing the first resilient member is provided at a bottom of the positioning body, wherein a first end of the first resilient member is mounted on the mounting groove, and a second end of the first resilient member contacts with the rotatable main shaft.

3. The bicycle gear shifter according to claim 2, wherein the resettable positioning member further comprises a boss for fixing the positioning pawl mounted on the positioning body and above the mounting groove; the fixing member is further provided with a guide groove that matches with the boss; wherein when the resettable positioning member moves reciprocally and linearly, the boss moves reciprocally and linearly inside the guide groove.

4. The bicycle gear shifter according to claim 2, wherein the resettable positioning member further comprises an auxiliary claw provided at an end of the positioning body away from the rotatable main shaft, wherein a gap is provided between the auxiliary claw and the positioning pawl.

5. The bicycle gear shifter according to claim 2, wherein the positioning body is provided with a force receiving portion for the release member to drive, and wherein the resettable positioning member is moveable after the release member applies force to the force receiving portion.

6. The bicycle gear shifter according to claim 5, wherein the force receiving portion refers to one of the following:
    (1) the force receiving portion is provided on both sides of one end of the positioning body;
    (2) the force receiving portion is an end surface of the positioning body;
    (3) the force receiving portion is provided on one end of the positioning body; and
    (4) the force receiving portion is connected to an end surface of the positioning body, and an angle between the force receiving portion and the positioning body is θ, wherein, 0°≤θ<90°.

7. The bicycle gear shifter according to claim 6, wherein in (4), the release member comprises the release lever and the second resilient member for resetting the release lever, the release lever is located on one side of the positioning body; the middle portion of one side of the release lever is hinged to the fixing member, and an angle between the release lever and the fixing member is θ, wherein, 0°≤θ<90°; wherein in operation, a first end of one side of the release lever pushes the force receiving portion, or a second end of one side of the release lever pushes the force receiving portion to drive the resettable positioning member to move; the second resilient member is connected to the release lever.

8. The bicycle gear shifter according to claim 1, wherein the fixing member comprises a bottom plate and a top plate connected to the bottom plate, the shift positioning ratchet and the actuating member are mounted between the bottom plate and the top plate through the rotatable main shaft, and the mounting member is connected to the bottom plate;
    the actuating member rotates coaxially with the shift positioning ratchet; the actuating member comprises a hollow shaft for arranging the cable and a third resilient member for resetting rotation of the hollow shaft; the third resilient member and the hollow shaft are sleeved on the rotatable main shaft; a first end of the third resilient member is mounted on the hollow shaft, and a second end of the third resilient member contacts with the top plate to achieve the resetting rotation of the hollow shaft and to drive the shift positioning ratchet that rotates coaxially with the hollow shaft to rotate reversely.

9. The bicycle gear shifter according to claim 1, wherein the drive member comprises a drive lever connected to the driving part, a fourth resilient member for resetting the drive lever, and a fifth resilient member for resetting the driving part; the fifth resilient member is provided between the driving part and the drive lever, wherein a first end of the fifth resilient member contacts with the driving part, and a second end of the fifth resilient member contacts with the drive lever; the fourth resilient member is sleeved on the rotatable main shaft, wherein a first end of the fourth resilient member contacts with the drive lever, and a second end of the fourth resilient member contacts with the fixing member.

10. The bicycle gear shifter according to claim 1, wherein the shift positioning ratchet comprises a ratchet body, and the drive teeth are provided along an edge of the ratchet body, the ratchet body is provided with a positioning groove, the positioning teeth and the release teeth are provided along two interior sides of the positioning groove respectively, and the positioning teeth and the release teeth are arranged alternately.

11. The bicycle gear shifter according to claim 1, wherein the shift positioning ratchet comprises a ratchet body, the drive teeth are provided along a first edge of the ratchet body, the ratchet body is provided with a positioning groove, the positioning teeth are provided along an edge on one side of the positioning groove, the release teeth are provided along a second edge of the ratchet body close to the positioning groove, and the positioning teeth and the release teeth are arranged alternately.

12. The bicycle gear shifter according to claim 6, wherein in (1), the force receiving portion refers to: a first force receiving portion and a second force receiving portion respectively located on two sides of one end of the positioning body; the release member comprises a release lever and a second resilient member for resetting the release lever; the release lever is located on one side of the positioning body, and a middle portion of one side of the release lever is hinged with the fixing member; wherein in operation, a first end of one side of the release lever pushes the first force receiving portion, or a second end of one side of the release lever pushes the second force receiving portion to drive the resettable positioning member to move; the second resilient member is connected to the release lever.

* * * * *